(12) United States Patent
Ahadian et al.

(10) Patent No.: US 11,761,828 B2
(45) Date of Patent: Sep. 19, 2023

(54) SINGLE WAVELENGTH FIBER GRATING SENSING WITH SPATIAL LOCATION

(71) Applicant: ULTRA COMMUNICATIONS, INC., Vista, CA (US)

(72) Inventors: Joseph Farzin Ahadian, San Marcos, CA (US); Sandra Skendzic, Vista, CA (US); Man W. Wong, San Diego, CA (US); Charles B. Kuznia, Encinitas, CA (US)

(73) Assignee: ULTRA COMMUNICATIONS, INC., Vista, CA (US)

( * ) Notice: Subject to any disclaimer, the term of this patent is extended or adjusted under 35 U.S.C. 154(b) by 302 days.

(21) Appl. No.: 17/227,059

(22) Filed: Apr. 9, 2021

(65) Prior Publication Data
US 2021/0318183 A1 Oct. 14, 2021

Related U.S. Application Data

(60) Provisional application No. 63/009,668, filed on Apr. 14, 2020.

(51) Int. Cl.
| | |
|---|---|
| *G01K 11/3206* | (2021.01) |
| *G01L 1/24* | (2006.01) |
| *G01K 11/32* | (2021.01) |
| *G02B 6/02* | (2006.01) |
| *G08B 29/04* | (2006.01) |

(52) U.S. Cl.
CPC ......... *G01K 11/3206* (2013.01); *G01K 11/32* (2013.01); *G01L 1/242* (2013.01); *G01L 1/246* (2013.01); *G02B 6/02076* (2013.01); *G08B 29/043* (2013.01)

(58) Field of Classification Search
CPC .... G01K 11/3206; G01K 11/32; G01L 1/242; G01L 1/246; G02B 6/02076; G08B 29/043
See application file for complete search history.

(56) References Cited

U.S. PATENT DOCUMENTS 5,442,169 A * 8/1995 Kunz .................. G01N 21/45
250/227.21
5,848,204 A * 12/1998 Wanser .............. G02B 6/02085
385/12

(Continued)

*Primary Examiner* — Nathaniel T Woodward
*Assistant Examiner* — Philip L Cotey
(74) *Attorney, Agent, or Firm* — Steinfl + Bruno LLP

(57) ABSTRACT

Methods and devices for a single wavelength fiber optic sensor system are described. Sensing is based on relative shift in spectral responses of two co-located fiber gratings (FBGs) within a fiber optic cable and measured at one measurement wavelength. Under a range of conditions of interest, the shift in spectral responses maintains the measurement wavelength within respective slopes of the spectral responses. A normalized difference in reflected power is used to desensitize the measurement from any variation in power of the single laser power and/or in loss through the fiber optic cable. Several pairs of co-located FBGs may be used within the same fiber optic cable, each pair used for sensing at a corresponding location. An OTDR system couples light pulses at the measurement wavelength to the fiber optic cable, and measures amplitudes and timing of corresponding reflected light pulses to perform the normalized difference.

17 Claims, 6 Drawing Sheets

(56) References Cited

U.S. PATENT DOCUMENTS

| | | | | |
|---|---|---|---|---|
| 6,024,488 | A * | 2/2000 | Wu | G01K 11/32 374/161 |
| 6,525,308 | B1 * | 2/2003 | Schmidt-Hattenberger | G01J 9/02 250/227.18 |
| 7,697,121 | B1 * | 4/2010 | Coroy | G01M 5/0091 356/478 |
| 7,899,105 | B1 * | 3/2011 | Hargis | H01S 5/146 372/102 |
| 2002/0027944 | A1 * | 3/2002 | Helmig | G01D 5/35316 374/E11.016 |
| 2004/0052444 | A1 * | 3/2004 | Moslehi | G01D 5/35316 385/13 |
| 2004/0067003 | A1 * | 4/2004 | Chliaguine | G01D 5/35303 385/13 |
| 2004/0245444 | A1 * | 12/2004 | MacDougall | G01B 11/165 250/231.19 |
| 2005/0111793 | A1 * | 5/2005 | Grattan | G01L 1/242 374/E11.016 |
| 2006/0013534 | A1 * | 1/2006 | Bohnert | G01L 9/0079 385/37 |
| 2008/0106745 | A1 * | 5/2008 | Haber | G01B 11/18 356/519 |
| 2016/0123715 | A1 * | 5/2016 | Froggatt | G02B 6/02123 65/102 |
| 2017/0075064 | A1 * | 3/2017 | Docter | G01D 5/35316 |
| 2017/0238821 | A1 * | 8/2017 | Hayes | A61B 5/02007 |
| 2017/0334574 | A1 * | 11/2017 | Wilson | G02B 6/4266 |
| 2019/0285487 | A1 * | 9/2019 | Seeley | G01L 1/246 |
| 2020/0271485 | A1 * | 8/2020 | Seeley | G01L 1/242 |
| 2021/0231526 | A1 * | 7/2021 | Seeley | G01B 11/18 |

* cited by examiner

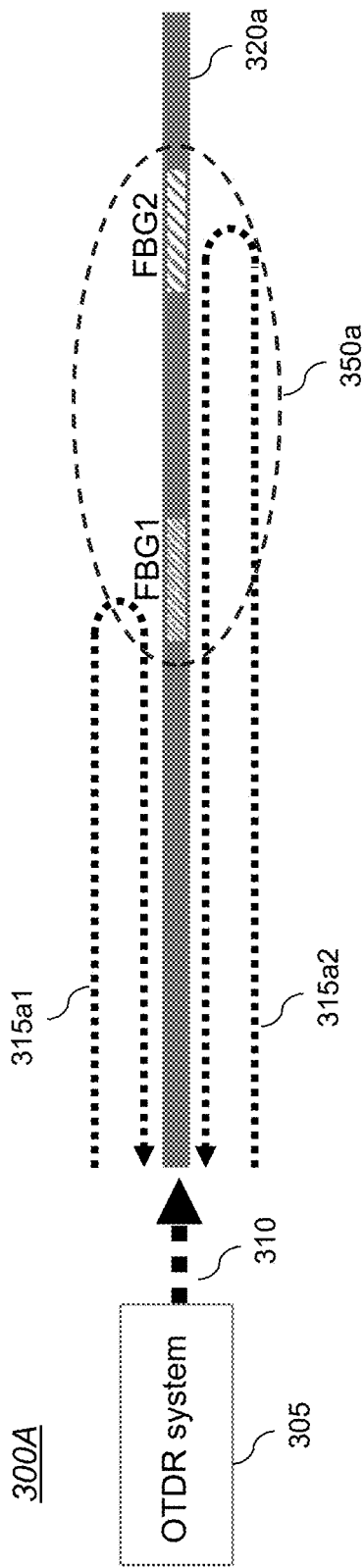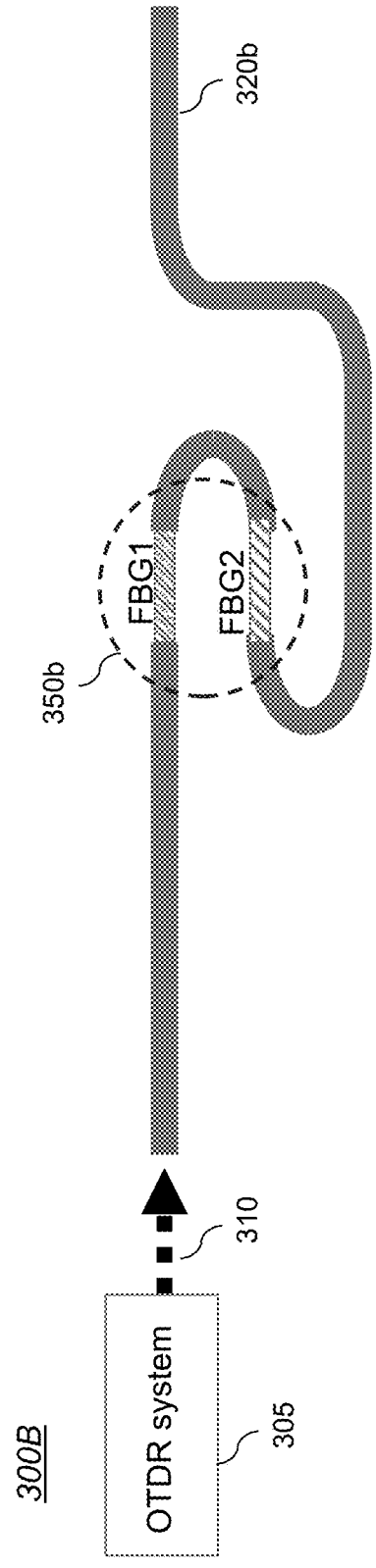
FIG. 3A
FIG. 3B

SINGLE WAVELENGTH FIBER GRATING SENSING WITH SPATIAL LOCATION

CROSS REFERENCE TO RELATED APPLICATIONS

The present application claims priority to U.S. Provisional Application No. 63/009,668 filed on Apr. 14, 2020, the contents of which are incorporated herein by reference in their entirety.

TECHNICAL FIELD

The present teachings relate to the field of fiber optic sensor systems. More particularly, the present teachings relate to methods and devices for a single wavelength fiber optic sensor system.

BACKGROUND

Fiber Bragg gratings (FBGs) change their reflection characteristics when subjected to changes in their environmental conditions. Accordingly, FBGs are widely used as fiber optic sensors to measure changes in environmental conditions (characteristics, parameters), such as, for example, changes in temperature, stress, moisture and chemical composition in the environment.

As known to a person skilled in the art, an FBG is a periodic structure of, that is embedded within an optical fiber path. The periodic structure of the FBG makes a light reflection of the FBG dependent on a wavelength of the light. Accordingly, a spectral response of the FBG can be tailored for different applications and as needed, via specific design of the periodic structure.

Current fiber optic sensor systems using FBGs may include a light source that emits a broad-wavelength spectrum (BWS) or a light source that is wavelength tunable (WT). Such systems measure a change in the spectral response of the FBG due to one or more changes in the environmental conditions. As known to a person skilled in the art, the FBG can be tailored/designed to be more sensitive with respect to changes of a target environmental parameter, and less sensitive with respect to changes of other environmental parameters.

In such systems using BWS or WT light sources, sensing at different locations along an optical fiber can be provided by including a respective FBG at each of the different locations. However, such approach typically may require that each of the FBGs have a unique and different spectral response. In some prior art implementations, expensive and bulky spectrum analyzers may be used to measure the different spectral responses of the FBGs, but these do not lend themselves well for installation in harsh and/or tight environments.

Another prior art approach for sensing an FBG along an optical fiber may include measurement of a change in the FBG reflection amplitude at a single wavelength. Such approach allows use of a simple laser that can be pulsed. However, in order to provide an accurate measurement of a change in characteristic (i.e., reflection amplitude) of the FBG, knowledge of an absolute value of the power (amplitude) of a light pulse transmitted through the optical fiber is required. This can be achieved via a calibration of the laser power (output) prior to the transmitting, or by measurement of a reflection having a known amplitude during use/measurement. However, either one of these two methods for evaluating an absolute value of the power of the transmitted light pulse may be corrupted if, for example, the laser power and/or a loss through the optical fiber change during the measurement. Known in the art implementations for sensing multiple FBGs along an optical fiber based on a simple (single wavelength) laser may build on the single FBG implementation described above with added complexity (and cost) to the fiber optic sensor system, such as, for example, added tunable optical filter elements, optical circulators, and other, to allow differentiation of light reflected from different FBGs from a combined reflected light.

It follows that there is a need for an FBG based fiber optic sensor system that is cost effective, compact and expandable from a single location sensing to multiple locations sensing. The present teachings disclose such system.

SUMMARY

According to a first aspect of the present disclosure, a sensor is presented, the sensor comprising: a first fiber Bragg grating (FBG) arranged within an optical fiber path, the first FBG having a first spectral response; a second FBG arranged within the optical fiber path in proximity of the first FBG, the second FBG having a second spectral response; wherein the sensor is configured for sensing of an environmental parameter over a range of values of the environmental parameter, and wherein over said range of values, respective first and second slopes of the first and second spectral responses overlap at a spectral region that includes a measurement wavelength used for sensing of the environmental parameter.

According to a second aspect of the present disclosure, a sensor is presented, the sensor comprising: a first fiber Bragg grating (FBG) arranged within an optical fiber path, the first FBG having a first spectral response; a second FBG arranged within the optical fiber path in proximity of the first FBG, the second FBG having a second spectral response; wherein the sensor is configured for sensing of an environmental parameter over a range of values of the environmental parameter, and wherein over said range of values, the first and second spectral responses overlap at a spectral region that includes a measurement wavelength used for sensing of the environmental parameter.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 3A shows a single wavelength fiber optic sensor system according to an embodiment of the present disclosure comprising the two FBGs arranged along a fiber optic cable.

FIG. 3B shows a single wavelength fiber optic sensor system according to an embodiment of the present disclosure comprising two FBGs arranged along a fiber optic cable subjected to stress.

DETAILED DESCRIPTION

Throughout this description, embodiments and variations are described for the purpose of illustrating uses and implementations of the inventive concept. The illustrative description should be understood as presenting examples of the inventive concept, rather than as limiting the scope of the concept as disclosed herein.

The present disclosure describes methods and devices for a single wavelength fiber optic sensor system that is cost effective, compact and able to operate in harsh environments. Such system can be packaged in a light weight, compact manner, and robust to environmental changes, such as, for example, changes in temperature, moisture, shock and vibration.

The single wavelength fiber optic sensor system according to the present teachings can be adapted to use a larger number of FBG sensors embedded within a single optical fiber. Such FBG sensors may be used to monitor/measure changes in environmental conditions, such as, for example, changes in temperature, strain, humidity, etc. For example, the FBG sensors can be packaged and/or designed in a manner to be sensitive to one of the environmental parameters while remaining insensitive to other environmental parameters.

Figure 1:
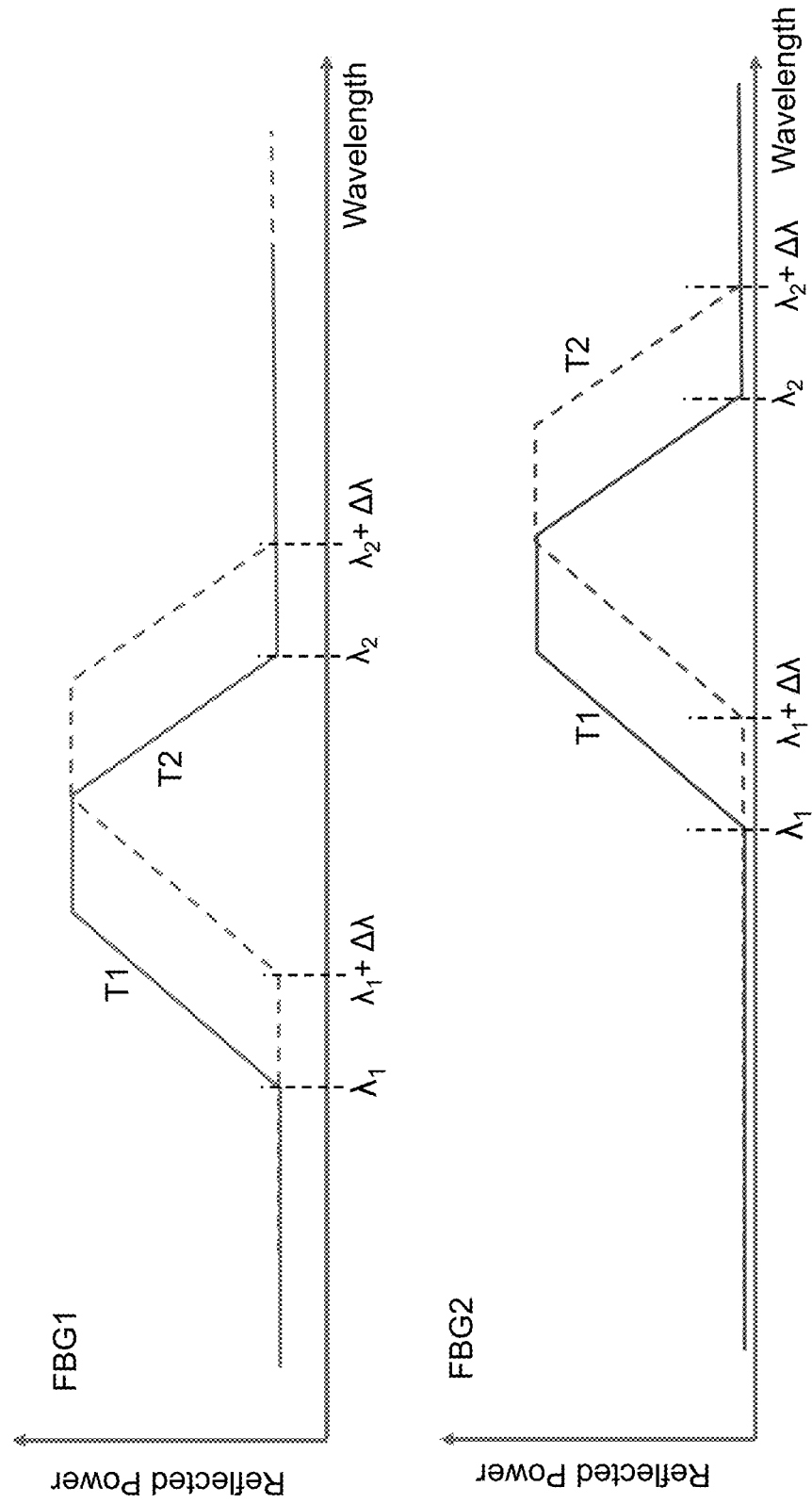
FIG. 1 shows graphs representative of exemplary spectral responses of two FBGs under two different environmental conditions.

FIG. 1 shows graphs representative of exemplary spectral responses (reflected power vs. wavelength) of two FBGs (FBG1, FBG2) under two different environmental conditions represented in the figure by the letters T1 and T2. For example, the top two graphs show the spectral response of an FBG sensor, FBG1, under a first environmental condition, T1, and under a second environmental condition, T2. As can be seen the two top graphs, the spectral response in the second environment T2 remains of a substantially same shape as the spectral response in the second environment T1, but is shifted along the wavelength axis by an amount $\Delta\lambda$. Similar shift of the spectral response of the FBG sensor, FBG2, can be observed in the bottom two graphs. It should be noted that sensitivity to a change in the environmental condition of the two FBG sensors, FBG1 and FBG2, represented by the shift $\Delta\lambda$, may be different for each of the two sensors. For example, as will be discussed later with reference to FIG. 2B, the second sensor, FBG2, may be insensitive to the change in the environmental condition.

As described above, the change in the environmental condition may be in view of a change (in value) of any environmental parameter that can affect the environmental condition, such as, for example, a change in temperature, strain, humidity, etc. Furthermore, the structures defining each of the FBGs (e.g., FBG1, FBG2) may be designed to provide a desired shape of the spectral response, including shapes and positions of the slopes (leading and trailing slopes) and width of the peak (top, substantially flat, portion).

Figure 2A:
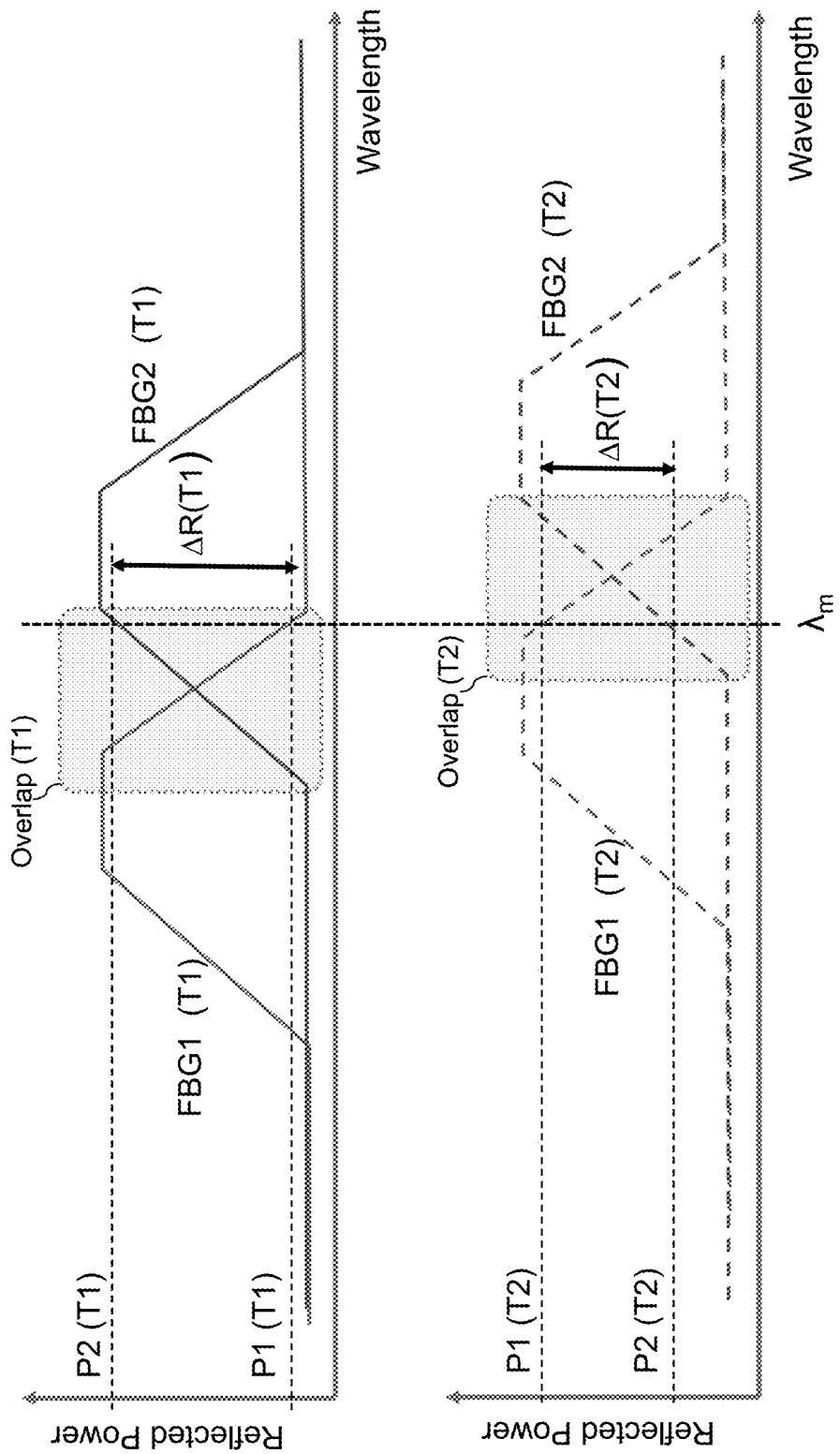
FIG. 2A shows representative graphs of a measurement according to an exemplary embodiment of the present disclosure of environmental parameters based on different spectral responses of two FBGs.

FIG. 2A shows graphs representative of a measurement according to an exemplary embodiment of the present disclosure of environmental characteristics based on different spectral responses of two FBGs, such as, for example, FBG1 and FBG2, described above with reference to FIG. 1. For example, the top two graphs show the spectral responses of FBG1 and FBG2 under a first environmental condition, T1, and the bottom two graphs show the spectral responses of FBG1 and FBG2 under a second environmental condition, T2.

As can be seen in FIG. 2A, at a measurement wavelength $\lambda_m$, a difference $\Delta R(T1)$ in reflected power $P1(T1)$ from FBG1, and $P2(T1)$ from FBG2, under the first environmental condition, T1, given by: $\Delta R(T1)=P2(T1)-P1(T1)$, is different from a difference $\Delta R(T2)$ in reflected power $P1(T2)$ from FBG1, and $P2(T2)$ from FBG2, under the second environmental condition, T2, given by: $\Delta R(T2)=P2(T2)-P1(T2)$. Teachings according to the present disclosure use a relative difference, $\Delta R(T1)-\Delta R(T2)$, as an indicator of a relative change in value of an environmental parameter. In particular, the teachings according to the present disclosure use the normalized difference, given by:

$$\Delta N_{(T1-T2)}=[\Delta R(T1)-\Delta R(T2)]/[\Delta R(T1)+\Delta R(T2)],$$

as the indicator of the relative change in the value of the environmental parameter. For example, if the environmental condition T1 is in view of a temperature value, t1, and the environmental condition T2 is in view of a temperature value, t2, then the teachings according to the present disclosure measure a relative difference (t1-t2) by using the normalized difference, $\Delta N_{(T1-T2)}$, given above. As person skilled in the art will appreciate that such normalized difference, $\Delta N_{(T1-T2)}$, varies with respect to a change in the environmental condition, but it is insensitive to any change of: a laser power used to provide a light source to the FBGs (FBG1, FBG2); and/or loss though an optical fiber used to guide the light source to the FBGs.

With continued reference to FIG. 2A, each of the differences $\Delta R(T1)$ and $\Delta R(T2)$ may be based on respective changes in reflected power provided by respective slopes of the spectral responses at the measurement wavelength $\lambda_m$. For example, as can be seen in FIG. 2A, the reflected power $P1(T1)$ and $P1(T2)$, at the measurement wavelength $\lambda_m$, are provided by the trailing (falling) slope of the spectral response of FBG1. On the other hand, the reflected power $P2(T1)$ and $P2(T2)$, at the measurement wavelength $\lambda_m$, are provided by the leading (rising) slope of the spectral response of FBG2.

Figure 2B:
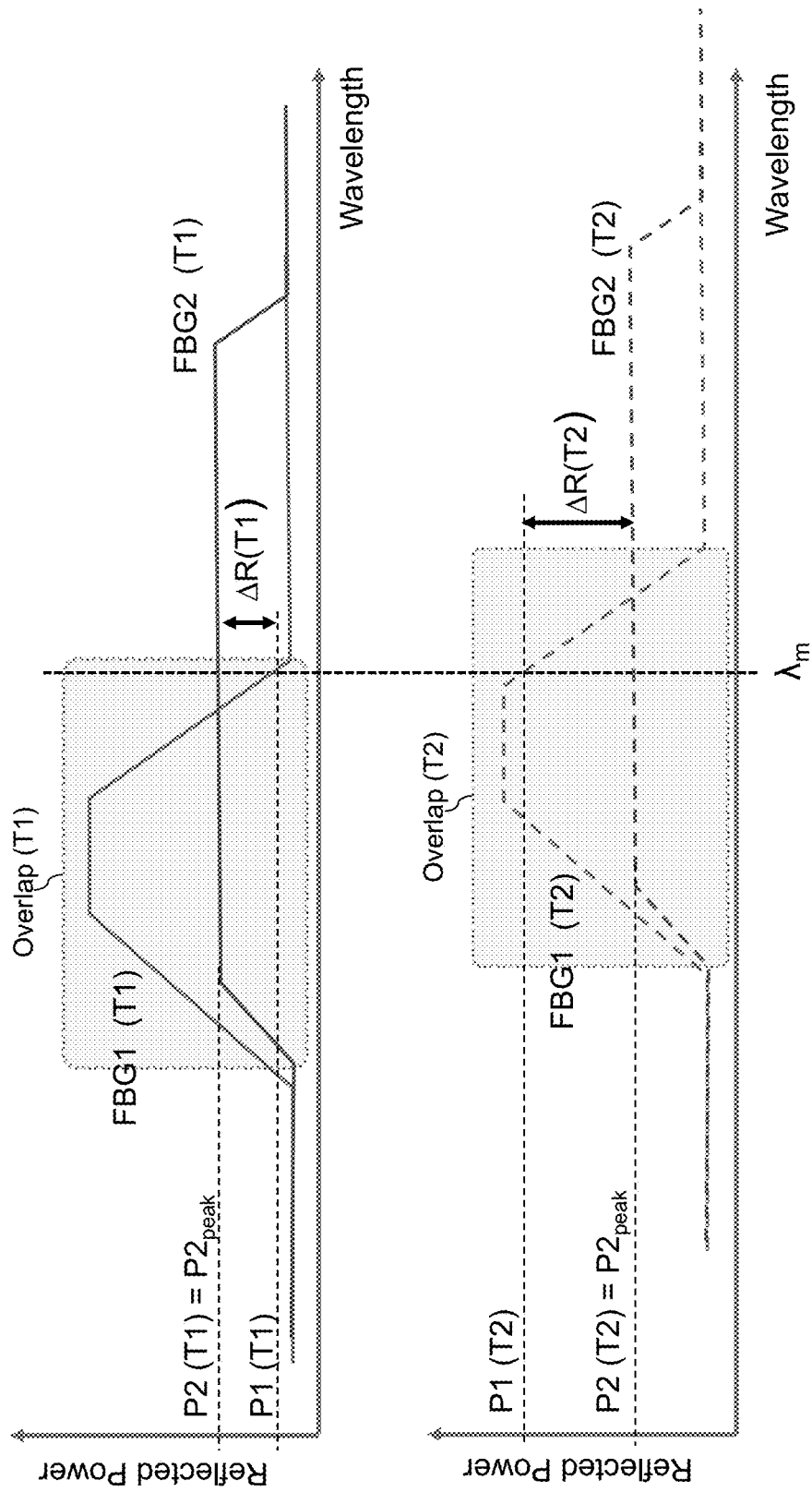
FIG. 2B shows representative graphs of a measurement according to another exemplary embodiment of the present disclosure of environmental parameters based on different spectral responses of two FBGs.

According to an exemplary embodiment of the present disclosure, FBG1 and FBG2 are designed to maintain overlapping slopes in a range of values of an environmental parameter of interest at the measurement wavelength $\lambda_m$. In other words, over said range of values, respective slopes of the spectral responses overlap at a spectral region that includes the measurement wavelength $\lambda_m$. For example, if the environmental parameter of interest is temperature, and the range of values is 5 degrees Celsius to 85 degrees Celsius, then FBG1 is designed so that for all values of temperatures in that range: the corresponding shift in the spectral response of FBG1 maintains the measurement wavelength $\lambda_m$ within the trailing (e.g., falling) slope of FBG1; and the corresponding shift in the spectral response of FBG2 maintains the measurement wavelength $\lambda_m$ within the leading (e.g., rising) slope of FBG2. It should be notes that the extent of shift of respective spectral responses of FBG1 and FBG2 responsive to a change in value of the environmental parameter need not necessarily be equal, so long that overlapping slopes can be maintained as discussed above. It should also be noted that the peak values of the spectral responses of FBG1 and FBG2 need not be substantially same as shown in FIG. 2A, rather, they may be different as shown in FIG. 2B According to an exemplary embodiment of the present disclosure, FBG1 and FBG2 are designed so that over the range of values of the environmental parameter of interest, a slope of the spectral response of the one of the two FBGs (FBG1 and FBG2) overlaps with the peak region of the spectral response of the other one of the two FBGs, as shown in FIG. 2B. As shown in FIG. 2B, for a value of the environmental parameter of interest at one extreme of the range (e.g., corresponding to the environmental condition T1), the difference ΔR(T1) is based on a value of P2(T1) that is equal to the peak value, $P2_{peak}$, of the spectral response of FBG2, and a value of P1(T1) that is provided by a slope (falling) of the spectral response of FBG1. Likewise, for a value of the environmental parameter of interest at the other extreme of the range (corresponding to the environmental condition T2), the difference ΔR(T2) is based on a value of P2(T2) that is equal to the peak value, $P2_{peak}$, of the spectral response of FBG2, and a value of P1(T2) that is provided by a slope (falling) of the spectral response of FBG1. In other words, through the range of values of the environmental parameter of interest, the measurement wavelength $\lambda_m$, remains in the peak region of the spectral response of FBG2 and in the slope region of the spectral response of FBG1.

Based on the description above with reference to FIG. 2A and FIG. 2B, a person skilled in the art would clearly realize that teachings according to the present disclosure equally apply to any pair of FBGs (e.g., FBG1 and FBG2) designed so that through the range of values of the environmental parameter of interest, the two spectral responses overlap (e.g., Overlap (T1), Overlap (T2) of FIG. 2A and FIG. 2B) at a spectral region (defined by start and end wavelengths) that includes the measurement wavelength $\lambda_m$, Furthermore, through said range of values, the relative difference, ΔR(T1)−ΔR(T2), monotonously varies as a function of a value within the range, in other words, for ant two different values of the value within the range, the relative difference, ΔR(T1)−ΔR(T2), is different. This can be obtained, for example via FBG1 and FBG2 shown in FIG. 2A or FIG. 2B, or any combination thereof. In other words, the range may be segmented into a plurality of continuous range segments, and within each of such range segments, the measurement wavelength, $\lambda_m$, travels along respective slopes of the two FBGs (e.g., per FIG. 2A), or along one slope of one FBG and along the peak of the other FBG (e.g., per FIG. 2B). That is to say, respective points of the two spectral responses corresponding to the measurement wavelength, $\lambda_m$, travel along respective slopes of the two spectral responses (e.g., per FIG. 2A), or along one slope of one spectral response and along the peak region of the other spectral response (e.g., per FIG. 2B).

FIG. 3A shows a single wavelength fiber optic sensor system (300A) according to an embodiment of the present disclosure comprising the two FBGs, FBG1 and FBG2, arranged along a fiber optic cable (320a). Such sensor system can measure a change in an environmental parameter affecting the two FBGs based on the normalized difference $\Delta N_{(T1-T2)}$ described above. Arrangement of the two FBGs along the length of the fiber optic cable (320a) subjects both FBGs to (substantially) same environmental condition.

With continued reference to FIG. 3A, an OTDR system (305) couples transmit light pulses (310) at the measurement wavelength $\lambda_m$ to the fiber optic cable (320a). Such transmit light pulses (310) travel along the fiber optic cable (320a) and portion of the light gets reflected by FBG1 and travels back to the OTDR system (305) according to an optical path (315a1). Another portion of the light gets reflected by FBG2 and travels back to the OTDR system (305) according to an optical path (315a2). The OTDR system (305) detects reflected light pulses and identifies such pulses as reflected from FBG1 or from FBG2 based on a time-of-flight (TOF) corresponding to respective optical paths (315a1) and (315a2). Furthermore, the OTDR system (305) measures the power of the reflected pulses, and derives a value of the environmental parameter based on the normalized difference $\Delta N_{(T1-T2)}$.

As shown in FIG. 3A, the two FBGs, FBG1 and FBG2, can be co-located in region (350a) along a same longitudinal segment of the fiber optic cable (310) that is in an extended configuration. Teachings according to the present disclosure equally apply to the pair of FBGs, FBG1 and FBG2, co-located in a region (350b) along different segments of a looped fiber optic cable (310) as shown in the configuration (300B) of FIG. 3B. This is true so long the two FBGs shown in FIG. 3B are insensitive to a stress generated by the looping of the fiber optic cable (310), and so long the two FBGs are subjected to a same environmental condition.

Figure 3C:
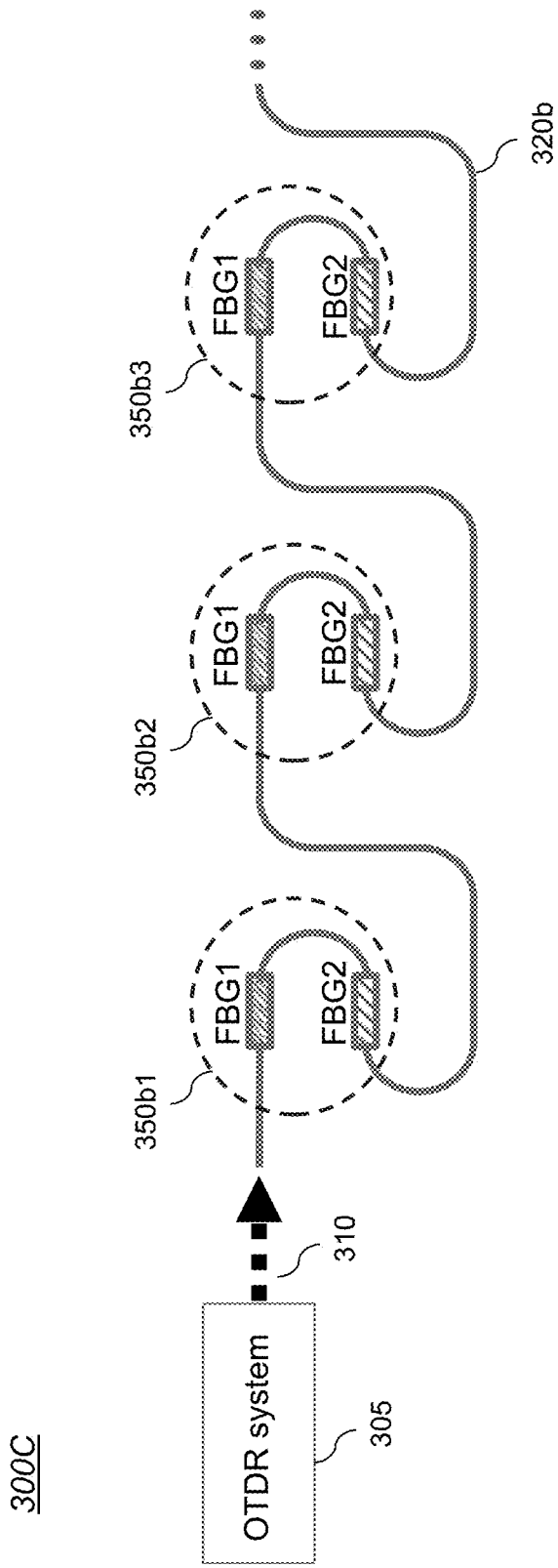
FIG. 3C shows a single wavelength fiber optic sensor system according to an embodiment of the present disclosure comprising a plurality of pairs of FBGs, each pair arranged along different regions of a fiber optic cable.

FIG. 3C shows a single wavelength fiber optic sensor system (300C) according to an embodiment of the present disclosure comprising a plurality of pairs of FBGs (FBG1, FBG2), each pair co-located along different regions (350b1, 350b2, 350b3, ... ) of the fiber optic cable (320b). A person skilled in the art will clearly realize that the configuration shown in FIG. 3C is based on the configuration described above with reference to FIG. 3A and FIG. 3B. Because the various FBGs arranged in the fiber optic cable (320b) are at different locations, respective TOFs can be used to identify corresponding reflected light pulses and sensing of the environmental parameter for each of the co-located pairs can be provided according to the above description. The configuration (300C) allows measurement of an environmental parameter of interest at each of the locations where co-located FBGs exist.

With continued reference to FIG. 3C, according to an exemplary embodiment of the present disclosure, the single wavelength fiber optic sensor system (300C) may be used as a fire detection system to detect engine fires in a jet-propelled aircraft. In such exemplary embodiment, the fiber optic cable (320b) may be routed around an engine compartment of the aircraft to sense the air temperature in multiple zones (350b1, 350b2, 350b3, ... ). The sensor system (300C) can provide a lighter weight solution compared to prior art systems and is advantageously immune to electro magnetic interference (EMI) which can affect operation of electronic sensors. Packaging of the OTDR system (305) may be compact, lightweight and constructed in view of any harsh environmental conditions expected in the aircraft.

Figure 4:
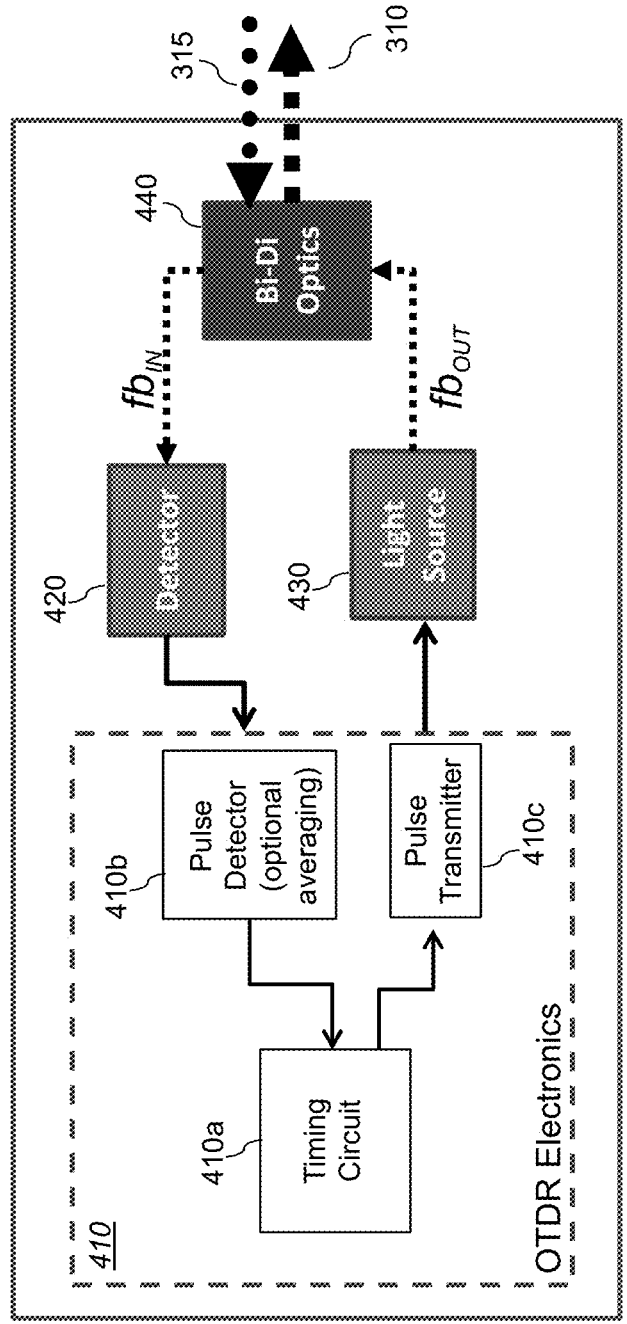
FIG. 4 shows a simplified block diagram of an exemplary ODTR system according to the present disclosure that can be used in the single wavelength fiber optic sensor of the present teachings.

FIG. 4 shows a simplified block diagram of an exemplary ODTR system (400) according to the present disclosure that can be used as the system (305) in any of the single wavelength fiber optic sensors (300A), (300B) and (300C) described above with reference to FIGS. 3A, 3B and 3C. As shown in FIG. 4, the OTDR system (400) comprises an electronic block (410), an optical detector (420, e.g., a photodiode), a light source (430, e.g., a laser, an LED) having an operating wavelength (substantially) equal to the measurement wavelength $\lambda_m$, and a bi-directional optical element (440). The electronic block (410) can generate an electronic pulse via a timing circuit (410a), which is transmitted, via a pulse transmitter circuit (410c) to the light source (430). The light source (430) in turn converts the electronic pulse to an optical pulse, $fb_{OUT}$, having an optical power corresponding, for example, to amplitude of the electronic pulse at the measurement wavelength $\lambda_m$. In turn, the optical pulse, $fb_{OUT}$, passes through the bi-directional optical element (440) and gets coupled to the fiber optic cable (e.g. 320a/b of FIGS. 3A-3C) as a transmit light pulse (310). It should be noted that the light source (430) may generate light at the wavelength that is nominally/substantially equal to the measurement wavelength, $\lambda_m$. As known to a person skilled in the art, such wavelength may drift based on temperature and/or age of the light source (e.g., laser diode) by an amount that even if measurable, is relatively insignificant in affecting a measurement according to the present teachings.

With further reference to FIG. 4, a reflected light pulse (315) is received by the bi-directional optical element (440) of the OTDR system (400) and fed to the detector (420) as an optical pulse, $fb_{IN}$. As clearly understood by a person skilled in the art, the optical pulse, $fb_{IN}$, may be a reflected pulse corresponding the transmit light pulse (310), and have an optical power that is provided by a spectral response (e.g., at the measurement wavelength $\lambda_m$) of an FBG along a fiber optic cable coupled to the OTDR system (400), as well as other losses inherent to the fiber optic cable. The detector (420) converts the optical pulse, $fb_{IN}$, to an electronic pulse which is fed to a pulse detector circuit (410b). The pulse detector circuit may measure amplitude of the electronic pulse and pass on timing information (i.e., edge positions) of the electronic pulse to the timing circuit (410a). Since the timing circuit (410a) also generated timing information (i.e., edge positions) of the electronic pulse used to generate the light transmit pulse (310), the timing circuit (410a) can identify a position of an FBG along the fiber optic cable that generated the reflected light pulse (315).

Accordingly, in view of the above embodiments, methods and devices have been disclosed that enable a single wavelength fiber optic sensor system including a plurality of FBGs.

It is understood that the specific order or hierarchy of steps in the processes disclosed is an example of applicable approaches. Based upon design preferences, the specific order or hierarchy of steps in the processes may be rearranged while remaining within the scope of the present disclosure. The accompanying method claims present elements of the various steps in a sample order and are not meant to be limited to the specific order or hierarchy presented.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such that the processor can read information from, and write information to, the storage medium.

It will be understood that many additional changes in the details, materials, steps and arrangement of parts, which have been herein described and illustrated to explain the nature of the invention, may be made by those skilled in the art within the principle and scope of the invention as expressed in the appended claims.

The invention claimed is:

1. A single measurement wavelength fiber optic sensor, comprising:
   a first fiber Bragg grating (FBG) arranged within an optical fiber path, the first FBG having a first spectral response;
   a second FBG arranged within the optical fiber path in proximity of the first FBG, the second FBG having a second spectral response;
   wherein the sensor is configured for sensing of an environmental parameter over a range of values of the environmental parameter via the single measurement wavelength, the range of values comprising a plurality of values,
   wherein over said range of values, respective first and second slopes of the first and second spectral responses overlap at a spectral region that includes the single measurement wavelength used for sensing of the environmental parameter, and
   wherein a measurement of a sensed value of the environmental parameter is based on a difference in amplitude, at the single measurement wavelength, between a first reflected light pulse reflected by the first FBG and a second reflected light pulse reflected by the second FBG.

2. The single measurement wavelength fiber optic sensor according to claim 1, wherein:
   the first slope is a falling slope of the first spectral response and the second slope is a rising slope of the second spectral response.

3. The single measurement wavelength fiber optic sensor according to claim 1, wherein:
   over said range of values, the first spectral response shifts and the second spectral response remains substantially constant.

4. The single measurement wavelength fiber optic sensor according to claim 1, wherein:
   the sensing is based on a light pulse at the measurement wavelength transmitted over said optical fiber path and respectively reflected by the first FBG and the second FBG.

5. The single measurement wavelength fiber optic sensor according to claim 4, wherein:
   a time of flight of a first reflected light pulse reflected by the first FBG is shorter in duration than a time of flight of a second reflected light pulse reflected by the second FBG.

6. The single measurement wavelength fiber optic sensor according to claim 1, wherein:
   the measurement is equal to the normalized difference.

7. The single measurement wavelength fiber optic sensor according to claim 1, wherein the sensor further comprises:

one or more pairs of FBGs similar in characteristics to FBG1 and FBG2, each pair arranged at different locations within the optical fiber path.

8. A single wavelength fiber optic sensor system, comprising:
the single measurement wavelength fiber optic sensor according to claim 7;
an OTDR system coupled to the sensor,
wherein the OTDR system is configured to:
couple a light pulse at the measurement wavelength to the sensor,
detect corresponding amplitude of the first and second reflected light pulses respectively reflected from the first and second FBGs, and
generate a normalized difference in amplitude between the first reflected light pulse and the second reflected light pulse.

9. A fire detection system, comprising:
the single wavelength fiber optic sensor system according to claim 8, wherein the sensor is configured to sense temperature of an environment.

10. The single measurement wavelength fiber optic sensor according to claim 1, wherein
the environmental parameter comprises one of: a) temperature; b) strain; or c) humidity.

11. A single wavelength fiber optic sensor system, comprising:
the single measurement wavelength fiber optic sensor according to claim 1;
an OTDR system coupled to the sensor,
wherein the OTDR system is configured to:
couple a light pulse at the measurement wavelength to the sensor,
detect corresponding amplitude of the first and second reflected light pulses respectively reflected from the first and second FBGs, and
generate a normalized difference in amplitude between the first reflected light pulse and the second reflected light pulse.

12. A fire detection system, comprising:
the single wavelength fiber optic sensor system according to claim 11, wherein the sensor is configured to sense temperature of an environment.

13. A single measurement wavelength fiber optic sensor, comprising:
a first fiber Bragg grating (FBG) arranged within an optical fiber path, the first FBG having a first spectral response;
a second FBG arranged within the optical fiber path in proximity of the first FBG, the second FBG having a second spectral response;
wherein the sensor is configured for sensing of an environmental parameter over a range of values of the environmental parameter via the single measurement wavelength, the range of values comprising a plurality of values,
wherein over said range of values, the first and second spectral responses overlap at a spectral region that includes the single measurement wavelength used for sensing of the environmental parameter, and
wherein a measurement of a sensed value of the environmental parameter is based on a difference in amplitude, at the single measurement wavelength, between a first reflected light pulse reflected by the first FBG and a second reflected light pulse reflected by the second FBG.

14. The single measurement wavelength fiber optic sensor according to claim 13, wherein:
over said range of values, a point of the first spectral response corresponding to the measurement wavelength travels along a slope of the first spectral response.

15. The single measurement wavelength fiber optic sensor according to claim 14, wherein:
over said range of values, a point of the second spectral response corresponding to the measurement wavelength travels along a slope of the second spectral response.

16. The single measurement wavelength fiber optic sensor according to claim 14, wherein:
over said range of values, a point of the second spectral response corresponding to the measurement wavelength travels along a peak region of the second spectral response.

17. A sensor, comprising:
a first fiber Bragg grating (FBG) arranged within an optical fiber path, the first FBG having a first spectral response;
a second FBG arranged within the optical fiber path in proximity of the first FBG, the second FBG having a second spectral response;
wherein the sensor is configured for sensing of an environmental parameter over a range of values of the environmental parameter via a measurement wavelength, the range of values comprising a plurality of values,
wherein over said range of values, respective first and second slopes of the first and second spectral responses overlap at a spectral region that includes the measurement wavelength used for sensing of the environmental parameter, and
wherein a measurement of a sensed value of the environmental parameter is based on a difference in amplitude, at said measurement wavelength, between a first reflected light pulse reflected by the first FBG and a second reflected light pulse reflected by the second FBG.

* * * * *